United States Patent
Anderson et al.

(10) Patent No.: US 11,816,234 B2
(45) Date of Patent: Nov. 14, 2023

(54) FINE-GRAINED PRIVACY ENFORCEMENT AND POLICY-BASED DATA ACCESS CONTROL AT SCALE

(71) Applicant: International Business Machines Corporation, Armonk, NY (US)

(72) Inventors: Maya Anderson, Netanya (IL); Ronen Itshak Kat, Kokav-Yair (IL); Roee Shlomo, Petah Tikva (IL); Ety Khaitzin, Petah Tikva (IL)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 15/924,396

(22) Filed: Mar. 19, 2018

(65) Prior Publication Data
US 2019/0286828 A1   Sep. 19, 2019

(51) Int. Cl.
*G06F 21/62* (2013.01)
*G06F 21/60* (2013.01)

(52) U.S. Cl.
CPC ............ *G06F 21/62* (2013.01); *G06F 21/604* (2013.01)

(58) Field of Classification Search
CPC .... G06F 21/604; G06F 21/62; G06F 21/6245; G06F 21/6263; H04L 63/102; H04L 67/10
See application file for complete search history.

(56) References Cited

U.S. PATENT DOCUMENTS

| | | | | |
|---|---|---|---|---|
| 8,914,323 | B1* | 12/2014 | Allen | G06F 16/245 |
| | | | | 707/623 |
| 9,224,006 | B1* | 12/2015 | Firestone | G06F 21/6227 |
| 9,231,974 | B2 | 1/2016 | Pedroza et al. | |
| 9,372,973 | B2 | 6/2016 | Giambiagi | |
| 9,537,893 | B2 | 1/2017 | Brucker et al. | |
| 9,690,792 | B2* | 6/2017 | Bartlett | G06F 16/245 |
| 10,452,975 | B2* | 10/2019 | Jacob | G06F 16/213 |

(Continued)

OTHER PUBLICATIONS

Liu et al., "Designing Fast and Scalable XACML Policy Evaluation Engines", IEEE Transactions on Computers, Dec. 23, 2010, pp. 1802-1817, vol. 60, Issue 12.

(Continued)

*Primary Examiner* — Trang T Doan
(74) *Attorney, Agent, or Firm* — Gregory J Kirsch

(57) ABSTRACT

Embodiments of the present systems and methods may provide a data access approval process that supports complex and fine-grained policies and can be applied to different data items at scale, which provides improvement over current technologies. For example, in an embodiment, a computer-implemented method for controlling access to data by computer systems may comprise generating an intermediate representation by integrating a combination of data access policies, data attributes including attributes per data subject, and the data itself to form the intermediate representation, receiving a request for access to the data, rewriting the request for access to the data to incorporate the intermediate representation so as to provide access only to data allowed by the policies integrated into the intermediate representation, and executing the rewritten request and providing only data allowed by the policies integrated into the intermediate representation.

14 Claims, 3 Drawing Sheets

(56) References Cited

U.S. PATENT DOCUMENTS

| | | | | |
|---|---|---|---|---|
| 2007/0056019 | A1* | 3/2007 | Allen | G06F 21/6236 726/1 |
| 2009/0300002 | A1* | 12/2009 | Thomas | G06F 16/2457 707/999.005 |
| 2014/0052749 | A1* | 2/2014 | Rissanen | G06F 21/6227 707/759 |
| 2015/0089575 | A1* | 3/2015 | Vepa | H04L 63/20 726/1 |
| 2015/0220659 | A1* | 8/2015 | Rissanen | G06F 21/6218 707/759 |
| 2015/0237073 | A1* | 8/2015 | Lang | H04L 63/20 726/1 |
| 2015/0288669 | A1* | 10/2015 | Litoiu | G06F 16/9535 726/4 |
| 2015/0365385 | A1* | 12/2015 | Hore | H04L 63/0428 713/152 |
| 2016/0246983 | A1* | 8/2016 | Rissanen | G06F 21/45 |
| 2016/0267293 | A1* | 9/2016 | Subbiah | G06F 21/6227 |
| 2017/0228552 | A1* | 8/2017 | Prafullchandra | H04L 63/10 |
| 2017/0372094 | A1* | 12/2017 | Hore | H04L 63/0428 |
| 2019/0258811 | A1* | 8/2019 | Ferraiolo | G06F 21/6218 |

OTHER PUBLICATIONS

Wang et al., "A logic-based framework for attribute based access control", In Proceedings of the 2004 ACM Workshop on Formal Methods in Security Engineering, 2004, ACM, pp. 45-55.

Thi et al., "Fine Grained Attribute Based Access Control Model for Privacy Protection", Future Data and Security Engineering, FDSE, 2016, pp. 305-316, Springer.

Lefevre et al., "Limiting disclosure in hippocratic databases", Proceeding VLDB '04 Proceedings of the Thirtieth international conference on Very large data bases, 2004, pp. 108-119, vol. 30.

Harmonia—an ANSI/INCITS Next Generation Access Control (NGAC) standard reference implementation.

* cited by examiner

FINE-GRAINED PRIVACY ENFORCEMENT AND POLICY-BASED DATA ACCESS CONTROL AT SCALE

BACKGROUND

The present invention relates to techniques for performing fine-grained data access policy enforcement that is scalable.

In the security domain, access control deals with restricting the activity of legitimate users, such as restricting access to certain data, or restricting certain uses of certain data. When an entity (requester) attempts to access a set of data items, an access control mechanism is executed in order to determine the subset of the data items that can be accessed and/or the transformation on the data items that needs to be run before providing access.

Regulations, such as the EU General Data Protection Regulation (GDPR), specify explicit data governance requirements that pose a challenge to access control systems. For example, to comply with GDPR, access control systems may need to consider the attributes of data subjects (e.g., whether the data subject has given consent to use its data for a specific purpose), the attributes of the entity requesting access to the data (e.g., the requester's location), the content of the protected data itself, and possibly other environment properties.

Therefore, access to a set of data items that contain information about different data subjects may require a complex data approval process that may incur high latency, depending on the amount of data items. Each data item may require an independent access control decision, hence each data item may contribute to additional latency and processing time—resulting in the data approval process not being efficiently scalable.

A need arises for techniques that implement a data access approval process that supports complex and fine-grained policies and can be applied to many different data items at scale.

SUMMARY

Embodiments of the present systems and methods may provide a data access approval process that supports complex and fine-grained policies and can be applied to different data items at scale, which provides improvement over current technologies.

Embodiments of the present systems and methods may provide data access policy enforcement at scale by separating policy decision logic into a pre-computation phase and a runtime phase. The pre-computation phase may process the policies, any non-runtime environment attributes, data items and supplementary attributes of the data. At this step, evaluation may be performed of all the policy parts that can be evaluated without the request context and run-time attributes. An intermediate representation of policies and data with placeholders for unknown runtime attributes may be generated and compiled to be executed during the enforcement. At a run-time enforcement phase, the intermediate representation may be completed with runtime attributes, evaluated and then efficiently executed by the data-source aware execution engine.

For example, in an embodiment, a computer-implemented method for controlling access to data by computer systems may comprise generating an intermediate representation by integrating a combination of data access policies, data attributes including attributes per data subject, and the data itself to form the intermediate representation, receiving a request for access to the data, rewriting the request for access to the data to incorporate the intermediate representation so as to provide access only to data allowed by the policies integrated into the intermediate representation, and executing the rewritten request and providing only data allowed by the policies integrated into the intermediate representation.

In embodiments, the method may further comprise generating at least one data access rule based on data access policies, data attributes including attributes per data subject, as a part of the intermediate representation. The method may further comprise extracting at least one logical clause from the data access rule wherein each clause contains data access attributes only from the group of properties that are known in pre-processing time, compiling and evaluating the extracted at least one logical clause into at least one evaluated clause comprising at least one data-source specific expression, and rewriting the request for access to data using the at least one evaluated clause. The intermediate representation may be generated remotely from storage of the data to be accessed, and the generated intermediate representation is stored close to the data to be accessed, and the method may further comprise storing the at least one evaluated clause in a compressed form. The method may further comprise including in the generated intermediate representation a masking function for masking at least some field values from data to be accessed. The data access rule may be generated in a pre-computation phase, and the request for access to data is rewritten and executed in a runtime phase. On the other hand, the data access rule may be generated, and the request for access to data is rewritten and executed, in a single phase.

In an embodiment, a system for controlling access to data by computer systems may comprise a processor, memory accessible by the processor, and computer program instructions stored in the memory and executable by the processor to perform generating an intermediate representation by integrating a combination of data access policies, data attributes including attributes per data subject, and the data itself to form the intermediate representation, receiving a request for access to the data, rewriting the request for access to the data to incorporate the intermediate representation so as to provide access only to data allowed by the policies integrated into the intermediate representation, and executing the rewritten request and providing only data allowed by the policies integrated into the intermediate representation.

In an embodiment, a computer program product for controlling access to data by computer systems may comprise a non-transitory computer readable storage having program instructions embodied therewith, the program instructions executable by a computer, to cause the computer to perform a method comprising generating an intermediate representation by integrating a combination of data access policies, data attributes including attributes per data subject, and the data itself to form the intermediate representation, receiving a request for access to the data, rewriting the request for access to the data to incorporate the intermediate representation so as to provide access only to data allowed by the policies integrated into the intermediate representation, and executing the rewritten request and providing only data allowed by the policies integrated into the intermediate representation.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide a data access approval process that supports complex and fine-grained policies and can be applied to different data items at scale, which provides improvement over current technologies.

Embodiments of the present systems and methods may provide data access policy enforcement at scale by separating policy decision logic into a pre-computation phase and a runtime phase. The pre-computation phase may process the policies, data item and supplementary attributes of the data. At this step, evaluation may be performed of all the policy parts that can be evaluated without the request run-time context and run-time attributes. An intermediate representation of policies and data with placeholders for unknown runtime attributes may be generated and compiled to be executed during the enforcement. At a run-time enforcement phase, the intermediate representation may be completed with runtime attributes, evaluated and then efficiently executed by the data-source aware execution engine.

Such techniques may provide fine-grained enforcement of policies. Complex Attribute-based access control (ABAC) policy expressions may be supported. Enforcement at runtime may provide efficient scalability. Filtering and/or masking of each data item using different criteria may be performed. Fetching of distant attributes (for example, consent) may be done in the pre-computation phase without adding runtime latency.

The present techniques may provide for enforcement at-scale of fine-grained attribute-based access control policies on various data sources and may also support privacy preserving policies. The policies may allow specifying access rules that are based on attributes and/or the content of the protected data source, attributes and/or the content of external data sources, runtime context attributes (e.g., request time, requester id, etc.), and the relationships among these attributes. Each policy may also specify a set of access attributes (that may be empty) and a set of protected data items (that may be empty) that are used as the key of the policy. For example, the policy may only be relevant when a user request targets protected data items and access attributes that are specified in the policy.

Data items may be of any granularity, for example, a table, a column or a cell in a relational database table.

Figure 1:
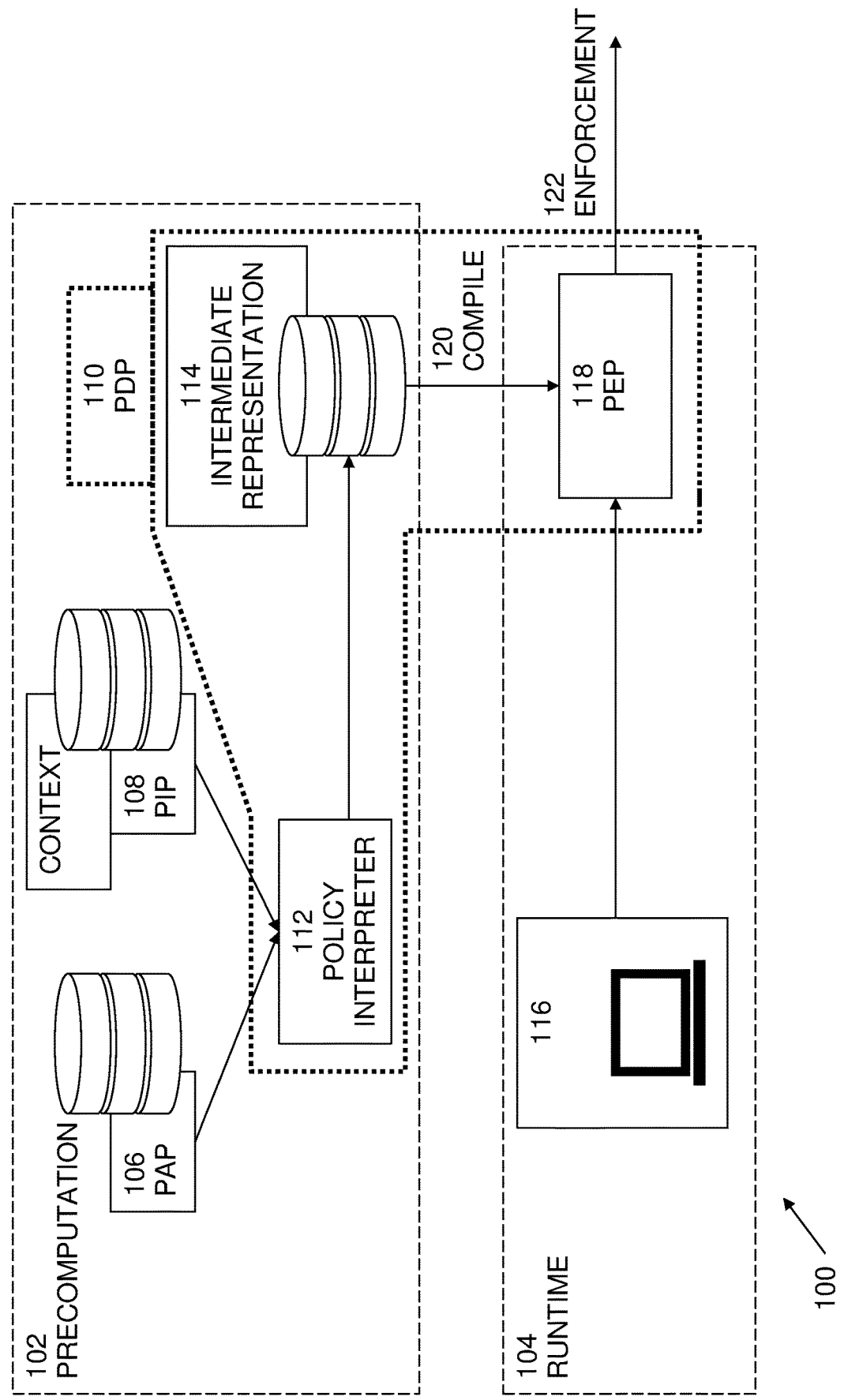
FIG. 1 illustrates a system in which described embodiments may be implemented.

An exemplary block diagram of a system 100, in which embodiments of the present systems and methods may be implemented is shown in FIG. 1. In this example, system 100 includes precomputation elements 102 and runtime elements 104. Precomputation elements 102 include Policy Administration Point (PAP) 106, Policy Information Point (PIP) 108, Policy Decision Point (PDP) 110, policy interpreter 112, and intermediate representation 114. Runtime elements include application 116 and Policy Enforcement Point (PEP) 118.

PAP 106 may be a system or component in which access policies may be stored and from which access policies may be retrieved. Access policies may include rules specifying access as being allowed, allowed with masking or not allowed, and such access may be based on users, organizations, roles, locations, data types, time-of-day, etc. Such policies may be expressly defined by administrators of the system or they may be automatically defined based on information gathered regarding the behavior of users, organizations, roles, locations, etc. relative to data types, time-of-day, etc. PIP 108 may supply supplemental data to be used in interpreting policies. For example, PIP may include context data relating to the policies. Policy interpreter 112 may receive policy information from PAP 106 and supplemental data from PIP 108.

In the example shown in FIG. 1, PDP 110 is divided into 2 parts. In the first part, policies are analyzed independently of the query execution path at the pre-computation stage 102. During this phase the policies are gathered from PAP 106 and supplementary (context) data is collected from PIP 108. For each combination of access attributes and target data attributes, for example, for a specific column in rectangular data, policy interpreter 112 generates a combined intermediate representation 114 of policies and supplementary data and saves them close to the data. Those generated combined intermediate representations may be shared among several combinations of access attributes and target data attributes. In the second part, during query execution runtime 104, the policies are enforced by PEP (Policy Enforcement Point) 118, using only this combined representation, instead of all the policies and supplementary data that might be located far away from the data and PEP 118 and incur high latency upon access.

Figure 2:
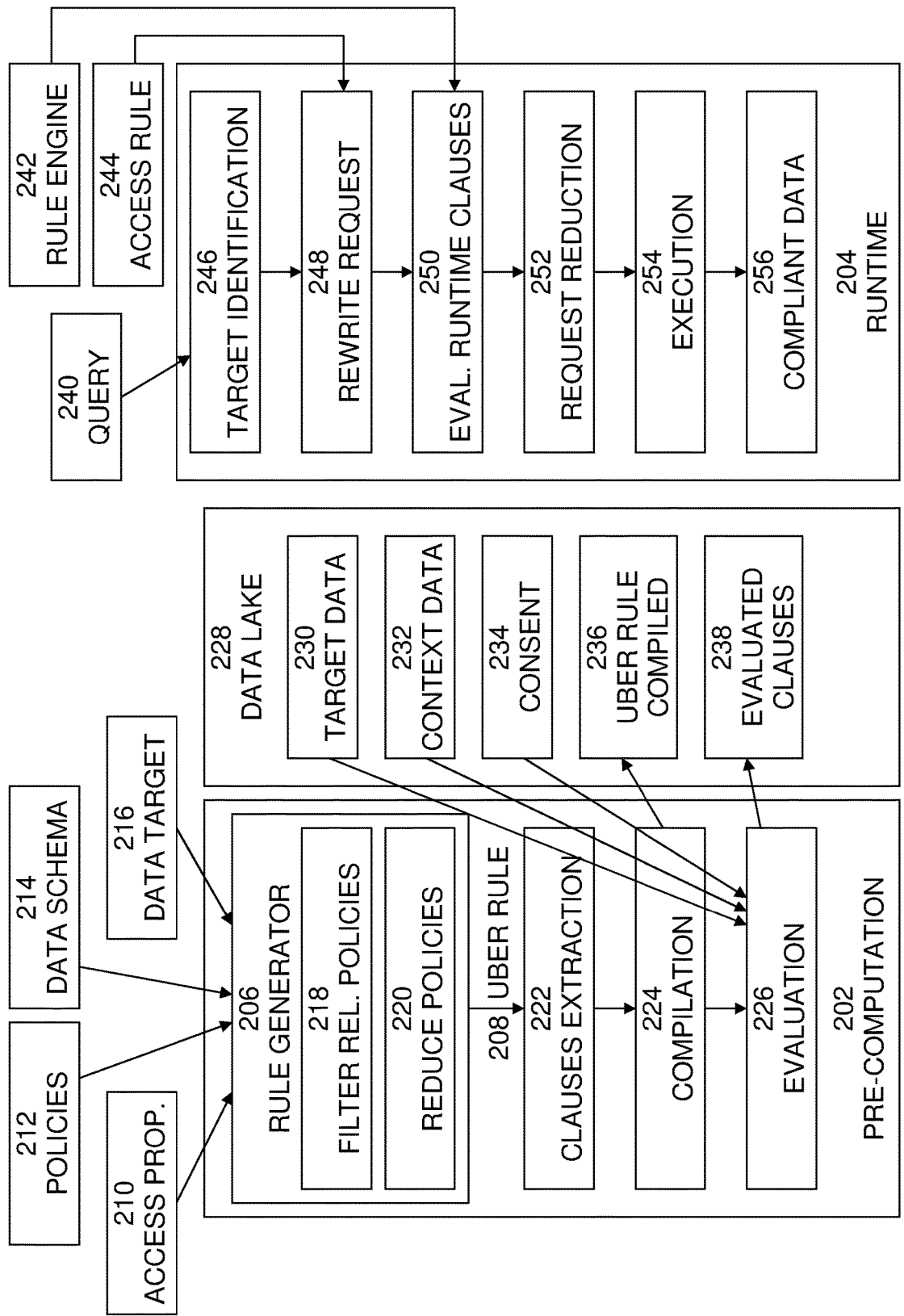
FIG. 2 is an exemplary data flow diagram of processes 200 involved in the present embodiments.

An exemplary data flow diagram of processes 200 involved in the present embodiments is shown in FIG. 2. In this example, pre-computation phase 202 and runtime phase 204 are shown. In pre-computation phase 202, rule generator 206 may receive data from a number of sources, including access properties 210, policies 212, data schema 214, and data target 216. Rule generator 206 may filter 218 policies 212 from PAP 106 to obtain relevant policies by, for example, grouping policies by their access attributes and target data items. For each group, the relevant policies may be collected, combined and reduced 220 by rule generator 206 into a single logical expression, which may be termed an Uber-rule 208. Like the original policy rules, Uber-rule 208 is an expression that depends on various attributes. These attributes may be divided into two groups: a group of attributes that are known only at runtime, for example, query time, and the other group of attributes that are known beforehand for example, a value from the data source and supplementary data. The pre-computation process 202 extracts 222 logical clauses from Uber-rule 208 such that each clause contains attributes only from the group of properties that are known in pre-processing time. Those clauses may have a Boolean value most of the time, but there are cases when they will have other values.

At 224, the logical clauses and/or the Uber-rule may be compiled into data-source specific expressions that can later be executed against relevant data sources. The compiled forms may be optionally stored in persistent storage 236. At 226, a pre-computation evaluator may then be used to evaluate non-runtime dependent logical clauses against the various relevant data sources. The relevant data sources may be stored in data lake 228 and may include target data 230, context data 232, consent data 234, etc. The result of this evaluation 238 may be stored inside/near the protected data source or near the enforcement point in a format that is native to the protected data source. The compiled Uber-rules 236 and the evaluated clauses 238 may be stored in data lake 228 as well. Data lake 228 may, for example, include a storage repository that stores large amounts of data in a raw or native format. Such data may be accessed by software that is designed to handle the raw or native format of each type of data. A data lake may use a flat architecture to store data, but in embodiments, clauses may be stored in a relational architecture similar to the data itself.

A runtime engine 204 may be used to govern access to protected data whenever a protected data item is being accessed, such as when a user submits a request or query 240 over the data. At 246, the access request 240 may be parsed and analyzed in order to identify the accessed data attributes, for example, to identify requested columns in a query, so that the relevant Uber-rules (targets) that govern these data attributes may be located. For example, there may be an Uber-rule for a specific access purpose and a specific column name, whose combination identifies the Uber-rule that should be used later. At 248, the user request or query may be rewritten into a new request that integrates the relevant Uber-rules into the original request. At 250, the missing runtime variables and clauses may be evaluated into concrete values that are substituted within the rewritten user request. At 252, the modified request may be reduced to a smaller set of terms. Such reduction may involve logical reduction of terms after evaluation of all the runtime attributes. For example, a rule may be defined as (requester.Country=="Germany" and Clauses.x1). After the value of requester.Country is known, the rule may be reduced to "False" if requester.Country is not Germany, or reduced to "Clauses.x1" otherwise.

At 254, the reduced request may be executed on the original data and the evaluated clauses 238 from pre-computation phase 202. The execution of the query is guaranteed to provide access only to compliant data 256 because the policies and all the data to evaluate them are embedded into the intermediate representation and later into the rewritten user request. For example, given an original request of: SELECT * FROM Data, the request may be rewritten into:

```
With Data AS (
  SELECT Data.ID,
  CASE WHEN (Clauses.X1 AND Consent.fields
  LIKE "%Name%") OR
  (NOT Clauses.X1) THEN data.Name
  ELSE NULL END AS Name,
  CASE WHEN ((Clauses.X1 AND Consent.fields
  LIKE "%Age%") OR
  (NOT Clauses.X1)) AND Clauses.X2
  THEN data. Age ELSE NULL
  END
  AS Age,
  FROM Data LEFT JOINT Clauses
  ON Data.ID = Clauses.ID
)
SELECT * FROM Data
```

In this example, the "With Data AS" part creates kind of a virtual view from which the selection may be done, while the "CASE WHEN" parts may include the Uber-rules for each column.

For example, in pre-computation phase 202, an SQL-compatible condition may be created for each column and access purpose, and may be evaluated for each data row (subject), taking into account the subject data and supplementary data like profile and consent. This condition and all the clauses from this condition (especially those related to supplementary data, which may be remote) may be evaluated and saved close to the guarded data for fast and easy retrieval. During an actual SQL query on that data, the query may be rewritten so that each field is retrieved only if the condition created earlier evaluates to true. This new query integrates into itself all the policies and may be executed in a scalable manner like a regular query on the data source. This query transformation may be done, even on a complex original query.

In embodiments, rather than execute the runtime steps 204 when a query 240 is received, the runtime steps 204 may be run at a pre-computation stage 202, for example, at the same time as pre-computation 202, or independently, after pre-computation 202, to create a view or a copy of the data per potential set of values of runtime attributes. Then when a query 240 is received, the query may be satisfied by selecting a suitable view based on the actual runtime attribute values.

In embodiments, compilation of the clauses and Uber-rules may be done not only in pre-computation 202, but also in the run-time 204, or in several steps at several times depending on the data sources and execution engine that is used.

The separation to pre-computation 202 and runtime 204 phases make sense for cases when supplementary data and policies are far from the decision point, and it is expensive to access them. In embodiments, the two phases may be integrated into one run-time step that still provides cell level and scalable access control. In this embodiment, the uber-rule may still be determined, clauses extraction and evaluation steps may be skipped, as these steps may be integral parts of the final execution step.

In embodiments, because evaluated clauses generally are evaluated into Boolean values, compression techniques may be used to save storage space. For example, a bit-encoded value may be created, wherein each bit is one clause and this "combined value" may be accessed per bit in the query.

In the general case, it may not be possible to combine all non-runtime data attributes in the pre-computation phase into exactly one clause. In embodiments in which all data attributes in the policy are known in the pre-computation phase, or in which it is easy to separate them from the online attributes, then this group of access attributes and target data fields may have only one clause, such as a True/False value indicating if access is permitted or not. In this embodiment, all the related policy logic may be already evaluated in this clause. This case may be easily combined with compression of clauses values, for example using bit-encoding techniques.

In embodiments, a policy result may not be restricted to Allow/Deny operations, but it may also require some masking on the field values. In this case, the masking function may be integrated into the Uber-rule, rather that only integrating the condition, wherein the value is retrieved if the condition is True. In this case the Uber-rule may need to integrate in itself all <condition+masking function> tuples, so the final value will be the correct value after the execution part.

Figure 3:
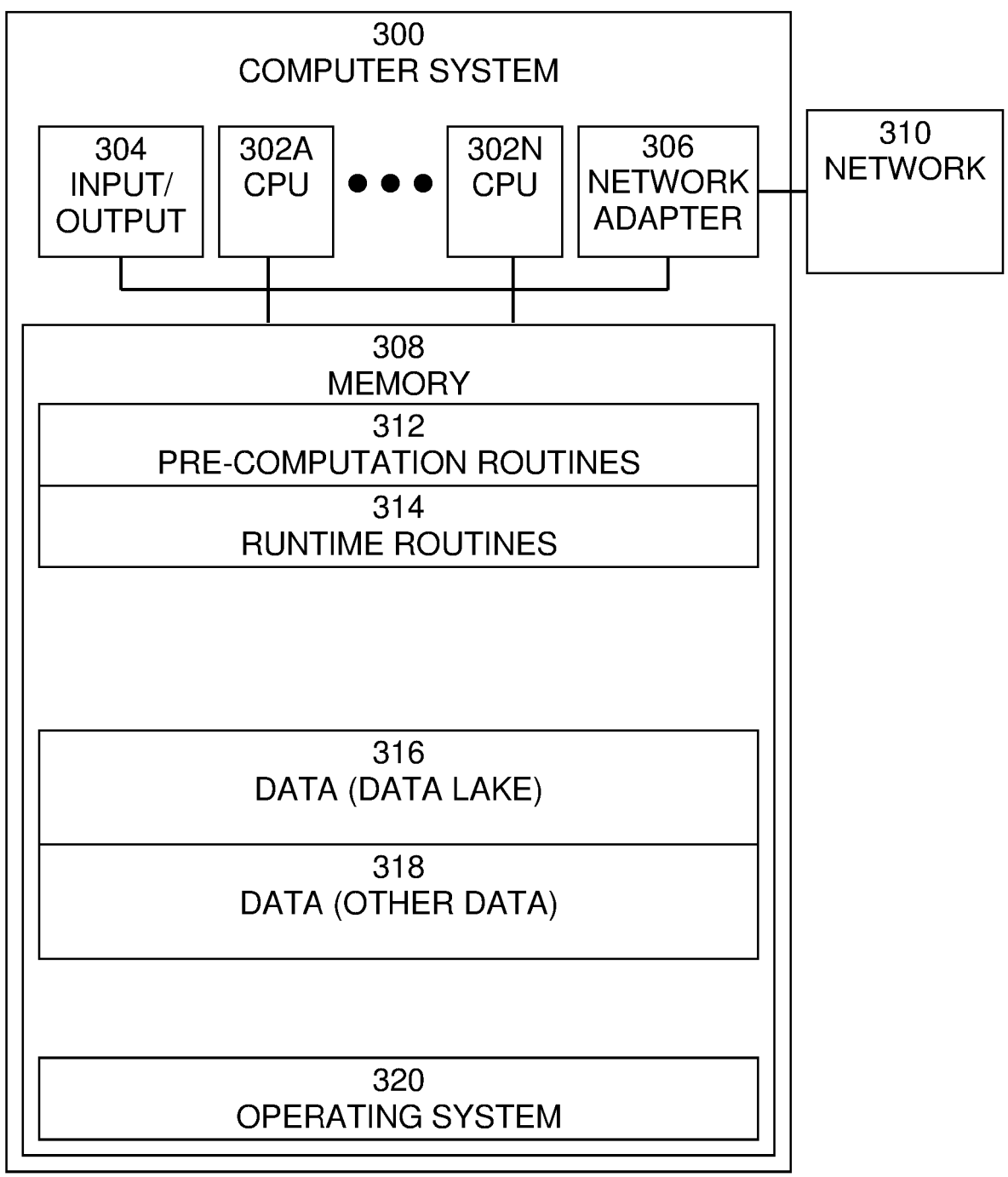
FIG. 3 is an exemplary block diagram of a computer system in which processes involved in the embodiments described herein may be implemented.

An exemplary block diagram of a computer system 302, in which processes involved in the embodiments described herein may be implemented, is shown in FIG. 3. Computer system 302 may be implemented using one or more programmed general-purpose computer systems, such as embedded processors, systems on a chip, personal computers, workstations, server systems, and minicomputers or mainframe computers, or in distributed, networked computing environments. Computer system 302 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 302 is implemented as a single multi-processor computer system, in which multiple processors 302A-302N share system resources, such as memory 308, input/output circuitry 304, and network adapter 306. However, the present communications systems and methods also include embodiments in which computer system 302 is implemented as a plurality of networked computer systems, which may be single-processor computer systems, multi-processor computer systems, or a mix thereof.

Input/output circuitry 304 provides the capability to input data to, or output data from, computer system 302. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 302. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 302 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In embodiments, at least a portion of the software shown in FIG. 3 may be implemented on a current leader server. Likewise, in embodiments, at least a portion of the software shown in FIG. 3 may be implemented on a computer system other than the current leader server.

In the example shown in FIG. 3, memory 308 may include pre-computation routines 312, runtime routines 314, data 316, such as data stored in data lake 228, shown in FIG. 2, data 318, such as other data shown in FIG. 2, and operating system 320. Pre-computation routines 312 may include software routines to perform pre-computation processing tasks, such as implementing rule generator 206, clauses extraction 222, compilation 224, and evaluation 226, shown in FIG. 2. Runtime routines 314 may include software routines to perform runtime processing tasks, such as target identification 246, request rewriting 248, runtime clause evaluation 250, request reduction 252, and request execution 254, shown in FIG. 2. Data 316 may include data, such as may be stored in data lake 228, such as target data 230, context data 232, consent data 234, compiled Uber-rules 236, and evaluated clauses 238, shown in FIG. 2. Data 318 may include data such as access properties 210, policies 212, data schema 214, data targets 216, queries 240, rule engine rules 242, access rules 244, and compliant data 256, shown in FIG. 2. Operating system 320 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for controlling access to data by computer systems, the method comprising:
   generating at least one rule governing access to the data by grouping a plurality of data access policies by related data access attributes, and combining and reducing the grouped plurality of data access policies to form a single logical expression;
   generating an intermediate representation by integrating a combination of clauses extracted from the single logical expression comprising variables and rules that govern data attributes, the data attributes including attributes per data subject, and the data itself to form the intermediate representation;
   extracting at least one logical clause from the generated at least one rule governing access to the data wherein the at least one logical clause contains data access attributes only from a group of properties that are known in a pre-computation phase;

compiling and evaluating the at least one logical clause into at least one selected clause comprising at least one data-source specific expression;

receiving a request for access to the data;

rewriting the request for access to the data into a new request for access by evaluating the variables and the at least one selected clause to concrete values, substituting the evaluated variables and the at least one selected clause into the new request for access, and reducing the new request for access based on the substitution, so as to provide access only to data allowed by the grouped plurality of data access policies integrated into the intermediate representation;

storing the at least one selected clause in a compressed form; and executing the new request for access and providing only data allowed by the grouped plurality of data access policies integrated into the intermediate representation.

2. The method of claim 1, wherein the intermediate representation is generated remotely from storage of the data to be accessed, and the generated intermediate representation is stored close to the data to be accessed.

3. The method of claim 2, further comprising:
including in the generated intermediate representation a masking function for masking at least some field values from data to be accessed.

4. The method of claim 2, wherein the intermediate representation is generated in a pre-computation phase, and the request for access to data is rewritten and executed in a runtime phase.

5. The method of claim 2, wherein the intermediate representation is generated, and the request for access to data is rewritten and executed, in a single phase.

6. A system for controlling access to data by computer systems, the system comprising processor circuitry, memory circuitry accessible by the processor circuitry, and computer program instructions stored in the memory circuitry and executable by the processor circuitry to perform:
generating at least one rule governing access to the data by grouping a plurality of data access policies by related data access attributes, and combining and reducing the grouped plurality of data access policies to form a single logical expression;
generating an intermediate representation by integrating a combination of clauses extracted from the single logical expression comprising variables and rules that govern data attributes, the data attributes including attributes per data subject, and the data itself to form the intermediate representation;
extracting at least one logical clause from the generated at least one rule governing access to the data wherein the at least one logical clause contains data access attributes only from a group of properties that are known in a pre-computation phase;
compiling and evaluating the at least one logical clause into at least one selected clause comprising at least one data-source specific expression;
receiving a request for access to the data;
rewriting the request for access to the data into a new request for access by evaluating the variables and the at least one selected clause to concrete values, substituting the evaluated variables and the at least one selected clause into the new request for access, and reducing the new request for access based on the substitution, so as to provide access only to data allowed by the grouped plurality of data access policies integrated into the intermediate representation;

storing the at least one selected clause in a compressed form; and executing the new request for access and providing only data allowed by the grouped plurality of data access policies integrated into the intermediate representation.

7. The system of claim 6, wherein the intermediate representation is generated remotely from storage of the data to be accessed, and the generated intermediate representation is stored close to the data to be accessed.

8. The system of claim 7, further comprising:
including in the generated intermediate representation a masking function for masking at least some field values from data to be accessed.

9. The system of claim 7, wherein the intermediate representation is generated in a pre-computation phase, and the request for access to data is rewritten and executed in a runtime phase.

10. The system of claim 7, wherein the intermediate representation is generated, and the request for access to data is rewritten and executed, in a single phase.

11. A computer program product for controlling access to data by computer systems, the computer program product comprising a non-transitory computer readable storage having program instructions embodied therewith, the program instructions executable by a computer, to cause the computer to perform a method comprising:
generating at least one rule governing access to the data by grouping a plurality of data access policies by related data access attributes, and combining and reducing the grouped plurality of data access policies to form a single logical expression;
generating an intermediate representation by integrating a combination of clauses extracted from the single logical expression comprising variables and rules that govern data attributes, the data attributes including attributes per data subject, and the data itself to form the intermediate representation;
extracting at least one logical clause from the generated at least one rule governing access to the data wherein the at least one logical clause contains data access attributes only from a group of properties that are known in a pre-computation phase;
compiling and evaluating the at least one logical clause into at least one selected clause comprising at least one data-source specific expression;
receiving a request for access to the data;
rewriting the request for access to the data into a new request for access by evaluating the variables and the at least one selected clause to concrete values, substituting the evaluated variables and the at least one selected clause into the new request for access, and reducing the new request for access based on the substitution, so as to provide access only to data allowed by the grouped plurality of data access policies integrated into the intermediate representation;
storing the at least one selected clause in a compressed form; and
executing the new request for access and providing only data allowed by the grouped plurality of data access policies integrated into the intermediate representation.

12. The computer program product of claim 11 wherein the intermediate representation is generated remotely from storage of the data to be accessed, and the generated intermediate representation is stored close to the data to be accessed.

13. The computer program product of claim 12, further comprising:

including in the generated intermediate representation a masking function for masking at least some field values from data to be accessed.

14. The computer program product of claim 12, wherein the intermediate representation is generated in a pre-computation phase, and the request for access to data is rewritten and executed in a runtime phase, or alternatively, the intermediate representation is generated, and the request for access to data is rewritten and executed, in a single phase.

* * * * *